United States Patent
Muller et al.

(10) Patent No.: US 9,995,617 B2
(45) Date of Patent: Jun. 12, 2018

(54) MEASURING DEVICE WITH A MECHANICALLY OSCILLATABLE UNIT AND AN ELECTRODYNAMIC TRANSDUCER UNIT

(71) Applicant: Endress + Hauser GmbH + Co. KG, Maulburg (DE)

(72) Inventors: Alexander Muller, Sasbach-Jechtingen (DE); Sergej Lopatin, Lorrach (DE); Tobias Brengartner, Emmendingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 169 days.

(21) Appl. No.: 14/368,718

(22) PCT Filed: Nov. 22, 2012

(86) PCT No.: PCT/EP2012/073385
§ 371 (c)(1),
(2) Date: Jun. 25, 2014

(87) PCT Pub. No.: WO2013/097991
PCT Pub. Date: Jul. 4, 2013

(65) Prior Publication Data
US 2015/0135826 A1 May 21, 2015

(30) Foreign Application Priority Data
Dec. 28, 2011 (DE) .......................... 10 2011 090 015

(51) Int. Cl.
*G01F 23/296* (2006.01)
(52) U.S. Cl.
CPC ........ *G01F 23/296* (2013.01); *G01F 23/2966* (2013.01); *G01F 23/2967* (2013.01)

(58) Field of Classification Search
CPC ............. G01F 23/2966; G01F 23/2967; G01F 23/2968
See application file for complete search history.

(56) References Cited

U.S. PATENT DOCUMENTS

| | | | | | |
|---|---|---|---|---|---|
| 2,472,249 | A | * | 6/1949 | De Giers | G01F 23/2966 318/132 |
| 2,584,128 | A | * | 2/1952 | Hildyard | G01F 23/2966 331/155 |

(Continued)

FOREIGN PATENT DOCUMENTS

| CN | 101331388 A | 12/2008 |
|---|---|---|
| DE | 19720519 A1 | 11/1998 |

(Continued)

OTHER PUBLICATIONS

Machine translation of DE102005062813.*

(Continued)

*Primary Examiner* — David Bolduc
(74) *Attorney, Agent, or Firm* — Bacon & Thomas, PLLC

(57) ABSTRACT

An apparatus for determining and/or monitoring at least one process variable of a medium in a container, comprising: a mechanically oscillatable unit; an electrodynamic transducer unit for exciting the oscillatable unit by means of an exciter signal to execute mechanical oscillations and for receiving the mechanical oscillations of the oscillatable unit and transducing them into an electrical, received signal; and an electronics unit, which at least determines and/or monitors the process variable based on the received signal. The invention is distinguished by features including that the electrodynamic transducer unit has exactly one coil, which serves both as a drive element as well as also a receiving element.

9 Claims, 2 Drawing Sheets

(56) References Cited

U.S. PATENT DOCUMENTS

| | | | | |
|---|---|---|---|---|
| 2,932,818 | A * | 4/1960 | Lubkin | G01F 23/2967 340/621 |
| 3,237,451 | A * | 3/1966 | Haeff | G01F 23/296 73/149 |
| 3,256,738 | A * | 6/1966 | Di Giacomo | B06B 1/08 310/26 |
| 3,326,043 | A * | 6/1967 | Roeske | G01F 23/26 340/618 |
| 3,585,457 | A * | 6/1971 | Zaander | G01F 23/2967 310/25 |
| 4,734,609 | A | 3/1988 | Jasmine | |
| 8,201,447 | B2 | 6/2012 | Boersig | |
| 8,434,350 | B2 | 5/2013 | Urban | |
| 2002/0057094 | A1 * | 5/2002 | Raffalt | G01F 23/2967 324/635 |
| 2003/0140695 | A1 * | 7/2003 | Fehrenbach | G01F 23/2967 73/290 V |
| 2004/0061511 | A1 * | 4/2004 | Kawakatsu | G01V 3/101 324/707 |
| 2004/0093941 | A1 * | 5/2004 | Lopatin | G01F 23/2967 73/290 V |
| 2005/0092077 | A1 * | 5/2005 | Lull | G01F 1/6847 73/204.15 |
| 2006/0053863 | A1 * | 3/2006 | Griessbaum | G01F 25/0061 73/1.73 |
| 2007/0169549 | A1 | 7/2007 | Kwun | |
| 2010/0083751 | A1 | 4/2010 | Boersig | |
| 2011/0179860 | A1 * | 7/2011 | Urban | G01F 23/2967 73/32 A |
| 2013/0139585 | A1 * | 6/2013 | D'Angelico | G01F 23/2966 73/290 V |

FOREIGN PATENT DOCUMENTS

| | | |
|---|---|---|
| DE | 102005062813 A1 | 7/2007 |
| DE | 102008050266 A1 | 4/2010 |
| EP | 2151672 A1 | 2/2010 |
| WO | 9853282 A1 | 11/1998 |
| WO | 2007073837 A2 | 7/2007 |
| WO | 2013097991 A1 | 7/2013 |

OTHER PUBLICATIONS

Machine translation of WO 9853282 A1.*
German Search Report, DPMA, Munich, dated Aug. 8, 2012.
International Search Report, EPO, The Netherlands, dated Mar. 24, 2013.
English translation of the IPR, WIPO, Geneva, Jul. 10, 2014.

* cited by examiner

MEASURING DEVICE WITH A MECHANICALLY OSCILLATABLE UNIT AND AN ELECTRODYNAMIC TRANSDUCER UNIT

TECHNICAL FIELD

The present invention relates to an apparatus for determining and/or monitoring at least one process variable, comprising a mechanically oscillatable unit, an electrodynamic transducer unit, which by means of an exciter signal excites the oscillatable unit to execute mechanical oscillations, and which receives oscillations from the oscillatable unit and transduces them into an electrical, received signal, and an electronics unit, which at least determines and/or monitors the process variable based on the received signal. The process variable is, for example, the fill level, the density, or the viscosity of a medium in a container.

BACKGROUND DISCUSSION

Known in the state of the art are so called oscillatory forks, which serve for monitoring a limit level of a liquid in a container, or for density or viscosity measurement. The mechanically oscillatable unit in the form of the oscillatory fork is excited by an electromechanical transducer unit to execute resonant mechanical oscillations. The electromechanical transducer unit receives the oscillations of the oscillatable unit and transduces them into an electrical, received signal dependent on the oscillation characteristics. Based on the electrical, received signal, the process variable is determinable. For fill level measurement, it is, for example, detected whether the oscillation frequency in the case of resonant exciting lies below or above a predetermined limit frequency. If the oscillation frequency exceeds the limit frequency, the oscillatable unit is oscillating in air; if the oscillation frequency subceeds, or falls beneath, the limit frequency, the oscillatable unit is covered with medium.

There are essentially two types of transducer units known: piezoelectric and inductive. Piezoelectric transducer units have either one piezoelement (e.g. German Application DE 3931453 C1) for exciting and receiving the oscillations or, separately, at least one exciter piezo and one receiver piezo (e.g. German Application DE 19720519 A1). Inductive transducer units have, as a rule, one coil for exciting the oscillations and another coil for receiving the oscillations. It is, however, also known, to use a coil for exciting the oscillations and a piezoelectric element for receiving the oscillations (e.g. German Application DE 4320411 C2).

In so-called one-piezo technology, the same piezoelement serves as a transmitter and a receiver of the mechanical oscillations of the oscillatable unit. Serving for supplying power to the piezoelement is, as a rule, an electrical alternating voltage having a rectangular waveform. In supplying a piezoelement with such a rectangular signal, the piezo capacitance undergoes reverse poling at each edge of the rectangular signal. This leads to charging and discharging, electrical currents. Additionally flowing is an electrical current corresponding to the mechanical movements. For evaluating the mechanical oscillations, the resulting electrical current is converted via a resistor into a voltage. The charging and discharging, electrical currents represent undesired disturbance signals in the evaluation.

Somewhat the same holds for one coil. Because of the strong coupling between transmitted signal and received signal, a wanted signal attributable to the oscillations of the oscillatable unit is only difficultly extractable based on the received signal. Therefore, in the case of an inductive drive, often the received signal is registered, not by means of a coil, but, instead, by means of a piezoelectric transducer element. The force coupling with the oscillatable unit required for piezoelements leads, however, for example, in the case of strong temperature fluctuations, to high forces on the piezoelectric transducer element.

SUMMARY OF THE INVENTION

An object of the invention is to provide an apparatus of the above described type having a robust and decoupled driving/receiving unit.

The object is achieved relative to an apparatus of the preamble for determining and/or monitoring at least one process variable of a medium in a container.

An apparatus of the invention for determining and/or monitoring at least one process variable of a medium in a container comprises a mechanically oscillatable unit, an electrodynamic transducer unit for exciting the oscillatable unit by means of an exciter signal to execute mechanical oscillations and for receiving the mechanical oscillations of the oscillatable unit and transducing them into an electrical, received signal, and an electronics unit, which at least determines and/or monitors the process variable based on the received signal. The electrodynamic transducer unit includes, in such case, a coil, which serves both as a drive element as well as also a receiving element.

The inductive transducer unit represents an efficient drive unit without the force interlocking of a piezoelectric transducer. In the case of shocks to the oscillatable unit or high temperature fluctuations, there are no damaging forces transferred to the transducer unit. The apparatus of the invention is, consequently, very robust. Furthermore, the apparatus is simple and inexpensive to manufacture.

In an embodiment, the apparatus includes a reference element having at least one reference coil, wherein the reference element is connected in parallel with the electrodynamic transducer unit and supplied with the same exciter signal, and wherein the reference element produces a reference signal uninfluenced by the oscillations of the oscillatable unit. The electronics unit extracts based on the received signal and the reference signal a wanted signal and determines and/or monitors the process variable based on the wanted signal. In this advantageous embodiment, the apparatus includes a measurement branch with the transducer unit and a reference branch with a reference element, wherein tappable from the measurement branch is a received signal and from the reference branch a reference signal. The received signal corresponds to a superpositioning of a disturbance signal and a wanted signal representing the oscillations. The disturbance signal results from charge reversal currents in the case of polarity change of the exciter signal. The reference signal is likewise brought about by charge reversal currents, which result from the polarity change of the exciter signal. The reference signal contains no oscillation dependent part. The charge reversal currents are dependent on the time constants of the respective branches. If the time constants of the measuring branch and reference branch are identical, the wanted signal is extractable, for example, by subtraction of the reference signal from the received signal. The disturbance signal contained in the received signal is canceled in such case. In this way, it is possible with one coil serving both as transmitter as well as also receiver to register an oscillation dependent, wanted signal of high quality, based on which the process variable is determinable with high accuracy.

In an embodiment, the reference element includes a first component of electrically adjustable size or value and connected electrically in series with the reference coil.

In an additional embodiment, the transducer unit includes a second component of electrically adjustable size and connected electrically in series with the coil. Preferably, first and second components are of equal construction.

In an embodiment, the first component and/or the second component are variable resistors, respectively is a variable resistor, especially a digital potentiometer, respectively digital potentiometers.

An embodiment provides that the size of the second component is adjustable in such a manner that the transducer unit has a predeterminable time constant.

In an embodiment, the electronics unit includes a control/evaluation unit, which controls the size of the first component to the value, in the case of which a magnitude of a disturbance signal in the wanted signal extracted based on the received signal and the reference signal is minimum.

In a further development, the control/evaluation unit is embodied, based on the disturbance signal, to determine the temperature of the coil.

A further development includes that a temperature sensor is provided, which determines the temperature at the site of the reference element, that the control/evaluation unit determines from the disturbance signal contained in the wanted signal the temperature difference between the coil and the reference element, and that the control/evaluation unit, based on the temperature at the site of the reference element and the temperature difference, determines the temperature of the coil.

In an embodiment it is provided that the apparatus monitors exceeding or subceeding a predetermined limit value of the process variable, that in the control/evaluation unit for a predetermined temperature range, in which the apparatus is applicable, threshold values are stored, which the process variable dependent, oscillatory characteristic has in the case of the reaching the limit value at the respective temperature, and that the control/evaluation unit monitors exceeding or subceeding the predetermined limit value based on the ascertained temperature and the threshold value associated with this temperature.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
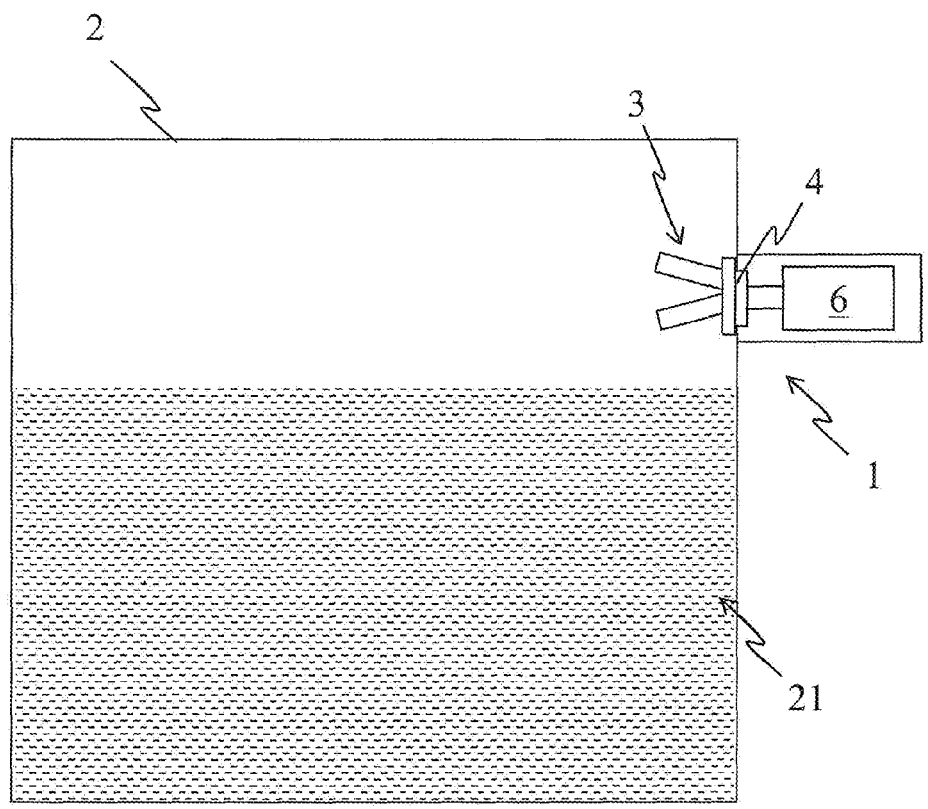
FIG. 1 is an apparatus for monitoring fill level in a container.

FIG. 1 shows an apparatus 1 for determining and/or monitoring a predetermined fill level, the density or the viscosity of a medium 21 in a container 2. The oscillatable unit 3 is formed as a fork of two rods, or tines, which are coupled with one another via a membrane and excitable via such to execute mechanical oscillations. The membrane terminally seals a tubular housing, which is mounted on the container 2 in such a manner that the oscillatable unit 3 is located at a height, which corresponds to the fill level to be monitored. Located in the housing is an inductive transducer unit 4 having a coil 41 and a magnet, via which the oscillatable unit 3 is excitable to execute oscillations and oscillations of the oscillatable unit 3 are receivable in the form of an electrical signal. The coil 41 and the magnet are arranged, in such case, in such a manner on projections of the oscillatory rods protruding into the housing interior that the two oscillatory rods are excitable by means of the transducer unit 4 to oppositely sensed movements perpendicular to their longitudinal axes. The control of the oscillation excitation and the evaluation of the oscillations occur by means of an electronics unit, which includes both analog as well as also digital components.

The oscillatable unit 3 is excited, as a rule, to resonant oscillations. Located in the electronics unit is at least one control/evaluation unit 6, for example, in the form of a microcontroller or an FPGA (field programmable gate array). The control/evaluation unit 6 evaluates the electrical, received signal in reference to the process variable to be determined. For example, for fill level determination, the control/evaluation unit 6 compares the oscillation frequency with a predetermined limit frequency. If the oscillation frequency lies below the limit frequency, the oscillatable unit 3 is covered with medium 21; if it lies above, the oscillatable unit 3 is oscillating freely.

The invention will be explained using the example of the oscillatory fork. However, the invention is likewise applicable in the case of measuring devices having other kinds of oscillatable unit 3, for example, an oscillatable unit 3 in the form of an oscillatory rod.

Figure 2:
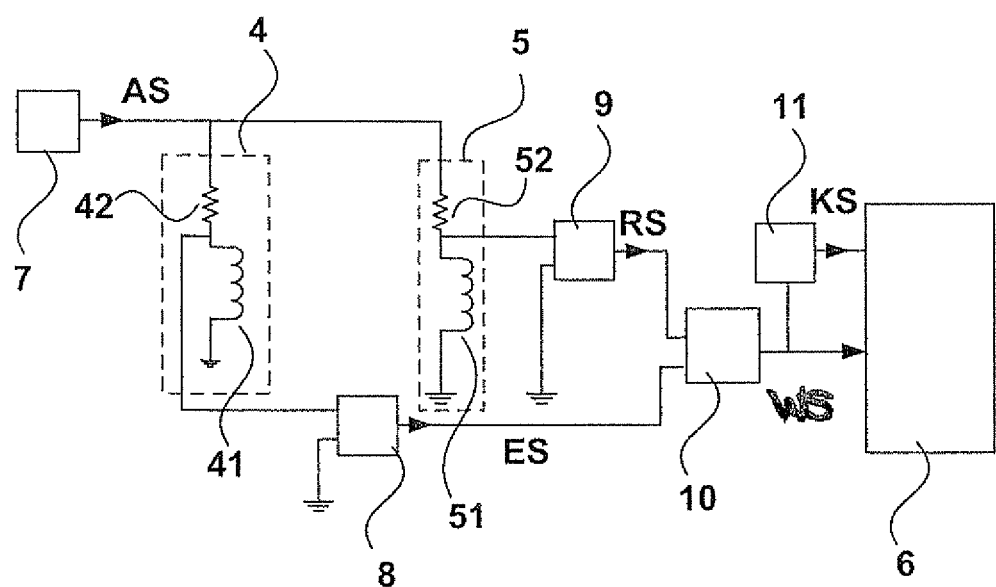
FIG. 2 is a block diagram of the apparatus.

FIG. 2 shows a block diagram of an apparatus of the invention. A signal generator 7 produces an electrical, alternating voltage having a rectangular waveform. This exciter signal AS is fed to the electrodynamic transducer unit 4 and to the reference element 5. The frequency of the exciter signal AS is preferably selected in such a manner that a predetermined phase shift exists between the exciter signal AS and the received signal ES of the transducer unit 4. As a rule, the phase shift amounts to 90° for exciting resonant oscillations. The electrodynamic transducer unit 4 has exactly one coil 41, which serves for exciting the oscillatable unit 3 to execute mechanical oscillations and equally also for receiving the oscillations. The reference element 5 likewise has one coil 41, which is referred to here as reference coil 51. Coil 41 and reference coil 51 are, in each case, supplied with the exciter signal via a resistor 42, 52. The reference element 5 mimics the behavior of the transducer unit 4 under the influence of the exciter signal AS, without being influenced by the oscillations of the oscillatable unit 3. The reference element 5 can have other components besides those illustrated. For example, a capacitor and a resistor can also be present, in order to match the transfer behavior of the reference coil 51 better yet to that of the coil 41.

The response signal of the coil 41 of the transducer unit 4 is composed of an oscillation dependent, wanted signal and a disturbance signal, which results from charge reversal currents, which are brought about by the exciter signal. This received signal ES lies on the output of the first voltage registration system 8. The response signal of the reference coil 51 contains no oscillation dependent part and is composed only of the disturbance signal caused by the charge reversal currents. This reference signal RS lies on the output of the second voltage registration system 9. Received signal ES and reference signal RS are fed to a difference amplifier 10. The difference amplifier extracts the wanted signal WS based on the received signal ES. If the time constants of the RL-units formed with the coil 41 of the transducer unit 4 and by the reference element 5 are equal, the disturbance signals in the reference signal RS and in the received signal ES cancel and the output signal from the difference amplifier 10 corresponds to the pure, wanted signal WS.

In an advantageous embodiment, the first resistor 52, which is connected in series with the reference coil 51, is a variable resistor, for example, in the form of a digital potentiometer. This enables a temperature compensation. At the reference temperature, the disturbance signals in the received signal ES and in the reference signal RS do not differ, because of the identical time constants. The inductance of the coil 41 has, however, a temperature dependence. This dependence effects a temperature dependent time constant of the RL-unit formed by the coil 41 and the second resistor 42 and results in a change of the disturbance signal contained in the received signal ES. The inductance of the reference coil 51 is likewise temperature dependent. Since, however, another temperature can reign at the site of the reference coil 51 than at the site of the coil 41 of the transducer unit 4 or also the time constants of the reference element 5 and the transducer unit 4 can have different temperature dependences, the disturbance signals in the received signal ES and in the reference signal RS can assume different forms. As a result of this, the disturbance signal in the received signal ES is no longer canceled in the difference forming and a supplemental disturbance signal KS is contained in the wanted signal WS. The disturbance signal KS can lead to a lessened accuracy of measurement.

The tunable first resistor 52 enables compensation of the disturbance signal KS arising in the wanted signal WS. The time constant of the reference element 5 is actively controllable by the variable first resistor 52 in such a manner that the time constant of the reference element 5 is matched permanently to that of the transducer unit 4.

The wanted signal WS is fed to a notch filter 11, which separates the actual oscillation dependent, wanted signal and the additional disturbance signal KS from one another. For this, the frequency blocked by the notch filter 11 is set to the frequency of the oscillation dependent, wanted signal, respectively to the excitation frequency. Preferably, the notch filter 11 is controllable, so that in the case of variable excitation frequency always the appropriate frequency can be filtered out. Instead of the notch filter 11, for example, a highpass filter can also be used. The control/evaluation unit 6 controls the value of the first resistor 52 in such a manner that the disturbance signal KS contained in the wanted signal WS has a minimum amplitude. In this state, the time constant of the reference element 5 is optimally matched to that of the transducer unit 4.

Advantageously, the control/evaluation unit 6 includes a sampling apparatus, which samples the disturbance signal KS at predetermined sampling points in time. The sampling points in time correspond preferably to the points in time, at which the exciter signal has extrema. In the case of complete compensation of the disturbance signal in the received signal ES with the assistance of the reference signal RS, the amplitude of the disturbance signal KS in the wanted signal is zero at these points in time. In the case of an amplitude different from zero, a logic unit of the sampling apparatus compares the sign of the sampled value with the sign of the exciter signal at this point in time, and ascertains, based on the comparison, a direction, in which the value of the first resistor 52 is to be corrected. Based on the sampled amplitude, the logic unit correspondingly ascertains the magnitude, by which the value is to be corrected.

Preferably, furthermore, also the size of the second resistor 42, which is connected in series with the coil 41 of the transducer unit 4, is adjustable. For example, the second resistor 42 is likewise a digital potentiometer. The adjusting of the second resistor 42 occurs, however, only once and is not changed during measurement operation. The size of the second resistor 42 is, in such case, selected in such a manner that the RL-unit formed of second resistor 42 and coil has at a predetermined reference temperature a predetermined time constant. The inductance of the reference coil 51 and the resistance value of the first resistor 52 are selected, respectively set, in such a manner that the reference element 5 has at the reference temperature the same time constant. Through the tunable resistance value of the second resistor 42, the value of the time constant of the transducer unit 4 is adjustable to a predetermined value and fluctuations because of variations in the used components can be cancelled by software. This is especially advantageous for the manufacturing, since for different, equally constructed measuring devices 1, in each case, the same time constant can be set. The reference element 5 is then adaptable to the predetermined time constant and need not be set differently for each measuring device 1. In this way, the value range of the variable first resistor 52 can be optimally utilized. A further advantageous effect of the first and second resistors 42, 52 being variable is that in the measurement branch with the transducer unit 4 and in the reference branch with the reference element 5 the same parasitic effects occur, so that these effects ideally completely cancel when producing the wanted signal WS by means of the difference amplifier 10.

The embodiment of the reference element 5 with a variable first resistor 52 offers besides temperature compensation also the opportunity for registering the temperature of the coil 41. Knowledge of the temperature is advantageous for increasing the accuracy of measurement of the apparatus. For example, the stiffness of the oscillatable unit 3 and therewith also the oscillation characteristics evaluatable for determining the process variables, e.g. the oscillation characteristics, resonant frequency, oscillation amplitude and phase shift between exciter signal and received signal, change with temperature. The temperature dependence of the oscillation characteristics leads, consequently, to a temperature dependent accuracy of measurement of the apparatus. With knowledge of the temperature, for example, a temperature dependence of the process variable, or of an oscillatory characteristic dependent on the process variable, can be compensated or a limit value established for monitoring the process variable. For example, the limit frequency, with which the current oscillation frequency is compared for fill-level monitoring, is modified as a function of temperature. Limit values associated with different temperatures can be furnished in the form of a table, or the adapting occurs by means of a formula.

The temperature of the coil 41 is ascertainable based on the disturbance signal KS extracted by means of the notch filter 11. The higher the amplitude of the disturbance signal KS, the greater is the temperature change as measured from the reference temperature. Due to the repeated readjustment of the resistance value of the first resistor 52, the amplitude of the disturbance signal KS is, however, not a good measure for the temperature. However, the resistance value of the first resistor 52 is uniquely related to the temperature at the site of the coil 41, so that a temperature determination can be made based on the resistance value. For temperature determination, there is preferably furnished in the control/evaluation unit 6 a characteristic curve, which gives the temperature dependence of the resistance value of the first resistor 52.

It is likewise possible to use for temperature measurement an auxiliary signal, which, in contrast to the exciter signal for determining the process variable, lies outside of the resonance range around the resonant frequency of the oscillatable unit 3. Present at the output of the difference amplifier 10 is then only the temperature dependent, disturbance signal.

The inductance of the reference coil 51 can, depending on choice of coil, have, same as the coil 41 of the transducer unit 4, a more or less strong, temperature dependence. In this case, only the temperature difference between coil 41 and reference coil 51 is determinable based on the disturbance signal KS in the wanted signal WS. For determining the temperature at the site of the coil 41, a temperature sensor is arranged in the vicinity of the reference coil 51. Based on the temperature of the reference coil 51 and the measured temperature difference, then the temperature at the site of the coil 41 is determinable.

The invention claimed is:

1. An apparatus which determines and/or monitors at least one process variable of a medium in a container, comprising:
   a mechanically oscillatable unit;
   an electrodynamic transducer unit for exciting said mechanical oscillatable unit by means of an exciter signal to execute mechanical oscillations and for receiving the mechanical oscillations of said mechanical oscillatable unit and transducing them into an electrical receiving signal, said electrodynamic transducer unit includes a coil, which serves both as a drive element as well as a receiving element;
   an electronics unit, which at least determines and/or monitors the process variable based on said received signal; and
   a reference element connected in parallel with said electrodynamic transducer unit and supplied with the same exciter signal, wherein:
   said electronics unit extracts from the received signal and the reference signal a wanted signal including a disturbance signal and determines and/or monitors the process variable based on said wanted signal; and
   said electronics unit includes a control/evaluation unit which determines from the disturbance signal the temperature difference between said coil and said reference element.

2. The apparatus as claimed in claim 1, wherein:
   said reference element includes a first component of electrically adjustable size and connected electrically in series with said at least one reference coil.

3. The apparatus as claimed in claim 2, wherein:
   said electrodynamic transducer unit includes a second component of electrically adjustable size and connected electrically in series with said coil.

4. The apparatus as claimed in claim 3, wherein:
   said first component and/or said second component is a variable resistor, especially a digital potentiometer.

5. The apparatus as claimed in claim 3, wherein:
   the size of said second component is adjustable in such a manner that said electrodynamic transducer unit has a predeterminable time constant.

6. The apparatus as claimed in claim 2, wherein:
   said electronics unit includes a control/evaluation unit, which controls the size of said first component to the value, in the case of which a magnitude of a disturbance signal in said wanted signal extracted from said received signal and said reference signal is minimum.

7. The apparatus as claimed in claim 6, wherein:
   said control/evaluation unit is embodied, based on the disturbance signal, to determine the temperature of said coil.

8. The apparatus as claimed in claim 7, wherein:
   the apparatus monitors exceeding or subceeding a predetermined limit value of the process variable, in said control/evaluation unit;
   threshold values for a process variable dependent oscillatory characteristic which the oscillatory characteristic has in the case of reaching the limit value at the respective temperature, are stored for a predetermined temperature range, in which the apparatus can be operated; and
   said control/evaluation unit monitors exceeding or subceeding the predetermined limit value based on the ascertained temperature and the threshold value associated with this temperature.

9. An apparatus which determines and/or monitors at least one process variable of a medium in a container, comprising:
   a mechanically oscillatable unit;
   an electrodynamic transducer unit for exciting said mechanical oscillatable unit by means of an exciter signal to execute mechanical oscillations and for receiving the mechanical oscillations of said mechanical oscillatable unit and transducing them into an electrical received signal, said electrodynamic transducer unit includes a coil, which serves both as a drive element as well as a receiving element;
   an electronics unit, which at least determines and/or monitors the process variable based on said received signal;
   a reference element having at least one reference coil, said reference element is connected in parallel with said electrodynamic transducer unit and supplied with the same exciter signal; and
   a temperature sensor, which determines a temperature at the site of said reference element, wherein:
   said reference element produces a reference signal uninfluenced by the oscillations of said mechanical oscillatable unit;
   said electronics unit extracts from the received signal and the reference signal a wanted signal and determines and/or monitors the process variable based on said wanted signal;
   said reference element includes a first component of electrically adjustable size and connected electrically in series with said at least one reference coil;
   said electronics unit includes a control/evaluation unit, which controls the size of said first component to the value, in the case of which a magnitude of a disturbance signal in said wanted signal extracted from said received signal and said reference signal is minimum;
   said control/evaluation unit is embodied, based on the disturbance signal, to determine the temperature of said coil;
   said control/evaluation unit determines from the disturbance signal contained in said wanted signal the temperature difference between said coil and said reference element; and
   said control/evaluation unit, based on the temperature at the site of said reference element and the temperature difference, determines the temperature of said coil.

* * * * *